United States Patent
Cordy, Jr.

(10) Patent No.: US 7,121,503 B2
(45) Date of Patent: Oct. 17, 2006

(54) BETTER BALANCED CANARD AIRPLANE WITH FORWARD ENGINE

(76) Inventor: Clifford B Cordy, Jr., 6402 Mae Anne #20, Reno, NV (US) 89523

( * ) Notice: Subject to any disclaimer, the term of this patent is extended or adjusted under 35 U.S.C. 154(b) by 0 days.

(21) Appl. No.: 10/845,024

(22) Filed: May 14, 2004

(65) Prior Publication Data

US 2004/0262450 A1 Dec. 30, 2004

Related U.S. Application Data

(63) Continuation-in-part of application No. 10/260,252, filed on Sep. 30, 2002, now abandoned.

(51) Int. Cl.
*B64C 39/12* (2006.01)
(52) U.S. Cl. .................................... 244/45 A; D12/332
(58) Field of Classification Search .............. 244/45 R, 244/45 A; D12/331, 332
See application file for complete search history.

(56) References Cited

U.S. PATENT DOCUMENTS

| | | | | |
|---|---|---|---|---|
| 1,890,059 A | * | 12/1932 | Lake | 244/12.5 |
| 2,957,647 A | * | 10/1960 | Shew | 244/12.6 |
| 4,124,180 A | * | 11/1978 | Wolowicz | 244/82 |
| D311,719 S | | 10/1990 | Haga | D12/328 |
| 5,098,034 A | * | 3/1992 | Lendriet | 244/39 |
| 5,454,530 A | | 10/1995 | Rutherford et al. | 244/7 A |
| 5,992,792 A | | 11/1999 | Arnason | 244/13 |
| 6,422,518 B1 | | 7/2002 | Stuff et al. | 244/199 |

* cited by examiner

*Primary Examiner*—Robert P. Swiatek
(74) *Attorney, Agent, or Firm*—Seed IP Law Group PLLC

(57) ABSTRACT

To optimize the performance of a canard airplane with an engine in front, the canard is mounted forward of its location in existing canard airplanes. Specifically, the canard is located with its leading edge significantly ahead of the firewall. This allows the canard to be mounted higher on the fuselage, providing aerodynamic improvements. The engine may be mounted to, or near, the canard spar, simplifying the structure. The added leverage of the further-forward canard allows the wing to be moved forward also. This makes possible a low wing under the occupants of the airplane. Efficient loading of the lifting surfaces is maintained by using a high aspect ratio canard.

20 Claims, 4 Drawing Sheets

BETTER BALANCED CANARD AIRPLANE WITH FORWARD ENGINE

RELATED APPLICATIONS

This application is a Continuation-In-Part of Ser. No. 10/260,252, filed Sep. 30, 2002, now abandoned.

FEDERALLY SPONSORED RESEARCH OR DEVELOPMENT

None

ABBREVIATIONS AND CONVERSION FACTORS

CG—center of gravity
TAS—true air speed          1 m/s = 2.2374 mph (used for speed)
m/s—meters per second       1 m/s = 196.85 ft/min (used for rate of climb)
km/l—kilometers per liter   1 km/l = 2.352 mpg (used for fuel consumption)
kW—kilowatts                1 kW = 1.340 horsepower

DEFINITIONS

Chord—The distance from the leading edge to the trailing edge of a wing or wing shaped structure. The chord may vary with position along the length of the wing. Unless otherwise specified, the root chord is assumed. This is the chord of the wing at its intersection with the fuselage.

Wing span—The tip-to-tip span of a wing, canard, or horizontal tail.

Aspect ratio—The tip-to-tip span of a wing, or wing shaped structure, divided by its root chord.

Shadow area—The area of the shadow cast by the wing (or other lifting surface) when illuminated by a point source of light far above the wing. The shadow area includes the area shadowed by the part of the wing which is within, above, or below the fuselage.

Loading—The weight per unit area supported by a wing or wing shaped structure. The area is normally taken to be the shadow area of the wing.

Spar—Any beam-like structure running lengthwise thru the central portion of a wing shaped structure. The spar increases the strength of the wing structure so it will not fail when large forces are applied.

Forward engine—An engine mounted toward the front of the fuselage of an airplane. Engines mounted in the wings are not forward engines. Obviously, a tandem-twin engine airplane (with one engine in front and one in the rear, both mounted in the fuselage), does have a forward engine and is covered by this patent, if the canard extends significantly forward of the firewall. It is also obvious that a three surface airplane (with a horizontal stabilizer in the rear in addition to the canard in front) is also covered by this patent, if there is an engine in front and if the canard extends significantly forward of the firewall.

BACKGROUND

Canard airplanes are inherently more efficient and safer than airplanes with a horizontal tail. The canard lifts where the horizontal tail pushes down. Hence there is less lift induced drag in a canard airplane. A properly loaded canard airplane cannot stall or spin. Hence it is safer. Still, canard airplanes have never been very popular. Existing designs have compromises that limit their usefulness. The major compromises include a severely limited range of position for the center of gravity (CG) and high takeoff and landing speeds.

In the last couple decades, experimental aircraft builders have made significant improvements in the performance of small planes. Some of these deserve mention here because some of the innovations described in this application are extensions to their work. First, the major proponent of canard aircraft is Burt Rutan. His best known planes are the VARI-EZE (which spawned a whole family of canard aircraft) and the Voyager (which flew around the world without refueling). A good quality VARI-EZE typically reaches a top speed of 90 m/s with a 75 kW engine. Second, the most popular homebuilt planes in the world are the RV family, designed by Dick Van Grunsven. These are conventional airplanes with horizontal tails. A good quality RV typically reaches a top speed of 90 m/s with a 120 kW engine. Both these designs fly about twice as fast as a small Cessna (for example) using little, if any, more power. Thus they go about twice as far on any given amount of fuel.

Klaus Savier, Santa Paula, Calif., built the world's fastest VARI-EZE. He increased the power produced by the standard engine by about 30% (which should give a 9% speed increase to about 98 m/s) and has streamlined his VARI-EZE to reach top speeds of about 110 m/s and fuel economy of 21 km/l at 90 m/s. Dave Anders, Visalia, Calif., built the world's fastest RV-4. He boosted the power by 50% (which should give a 15% speed increase to 103 m/s) and has streamlined it to reach a speed of 122 m/s. The work of both these builders is well known within the experimental aircraft community.

Another airplane that deserves mention is the AR-5, which was designed from scratch by Mike Arnold. It is a conventional style airplane with outstanding aerodynamics. It is a one place airplane powered by an engine producing 49 kW. It flew 93 m/s in level flight and set a world record of 95 m/s for airplanes weighing under 300 kg in flight. (The official race rules allow some descent over the measured distance.) There are no plans or detailed information about this airplane. It has been studied carefully only by a few specialists at the invitation of the owner/builder. One known problem in the airplane is that the engine overheats with little provocation. Marginal cooling is one solution to the cooling drag problem. This might be acceptable for a single purpose airplane designed to break a speed record, but it is not acceptable in a general purpose aircraft.

One big disadvantage of the EZ family is the limited range of CG with which it can be flown safely. This results in the condition that, on the ground, the plane falls over backward when the pilot is not in it. The EZ airplanes are tricycle gear planes with the engine in the rear. If it falls over backward, it generally causes serious damage. The main disadvantage of the RV family is that they are conventional airplanes, hence can stall and spin if the speed is not high enough. Neither family of airplanes is designed to be as aerodynamic as desirable and the exceptional performance achieved by Klaus and Dave are the result of considerable investment of personal time and ingenuity.

Dr. Cliff Cordy built a Quickie II which flies over 80 m/s with a 45 kW engine. This is extremely fast for the power, despite the abominable engine cooling and wheel fairings that were part of the kit design. That means the wings and fuselage are extremely aerodynamic. The big disadvantage of the Q2 is that the canard is behind the engine, thus very heavily loaded. In order for the wing to be far enough forward to act as a wing, not a horizontal stabilizer, the distance from the wing to the canard must be small, and the CG of the airplane is very critical.

There is no prior single engine canard airplane that has a reasonably wide range of allowable CG position. The main difficulty in designing a single engine canard airplane is that the engine must be at the front or rear of the airplane, not on the wing, as is possible in a twin engine airplane. Placing the engine above the airplane is theoretically possible, but that introduces a whole set of undesirable mechanical and aerodynamic problems. In existing airplanes with the engine in front, as in the Quickie family, the canard has to carry the majority of the weight of the airplane. This forces the canard to be large, and it almost becomes the wing. To keep the wing far enough forward to function as a wing instead of a horizontal stabilizer, the distance from the wing to the canard must be small. This results in an undesirably critical location of the CG. If the engine is in the rear, as in the EZ family, and in the original incarnation of the race airplane named Pushy Galore, the wing carries most of the weight, but the pusher configuration introduces a new set of limitations, including the impossibility of making a taildragger configuration (with a small tail wheel as opposed to a nose wheel) and less efficient engine cooling.

No existing canard airplane that is designed to fly fast provides the ability to fly and land at low speeds. In conventional aircraft, slow flight is achieved by using wing flaps. In a canard design, the use of wing flaps would actually increase the minimum flying speed.

SUMMARY

To improve aerodynamics and handling of small canard aircraft with an engine in front, the canard is located further forward than in existing designs. The leading edge of the canard is significantly forward of the firewall. This gives a wider range of acceptable CG locations. The loading on the canard is reduced, giving improved load carrying capability and reduced lift induced drag. The engine may be mounted directly to the canard structure. Flaps are mounted on both the wing and canard to give the ability to fly slower for a given size of the wing and canard.

BRIEF DESCRIPTION OF THE ILLUSTRATIONS

DETAILED DESCRIPTION OF THIS INVENTION

Canard Location

The secret of success in designing a canard airplane with an engine in front is to get the canard far enough forward that it does not carry too much weight. In the Quickie family, the canard is located just below and behind the firewall. If everything is balanced just right, this is not a terrible situation, especially at high speed. But the big canard, heavily loaded, and big elevators, generate excess lift induced drag and control surface drag, especially at lower speeds such as at takeoff, landing, and during maximum climb. The lift induced drag also increases with altitude, limiting the altitude that the plane can reach, and limiting its speed at the altitudes it can reach. It would be desirable to move the canard forward and place the engine in the center of the canard. Structurally, this is impractical. It would be very difficult to build a structure that maintains the required strength of the canard and still allows the required access to the engine. Placing the canard under the engine would compromise the aerodynamics of the airframe. Placing the canard over the engine would not only compromise the aerodynamics, it would also interfere with the view of the pilot.

This novel design places the canard further forward than it is in present designs. There are many advantages. This far-forward canard carries a smaller fraction of the total weight, giving aerodynamic advantages in the lift induced drag and control surface drag (relative to a Quickie, for instance). The CG has a wider range of acceptable locations. The engine can be mounted directly to the canard (which basically is carrying the engine in any case) rather than having those forces transmitted thru the airframe. Of course, adequate structure must be provided to keep the canard attached to the rest of the airplane. Depending on the design details, this will generally be simpler and lighter than the structure required for a bed mounted engine. If the airplane is tricycle gear, the nose wheel can be mounted to the canard structure also. The canard carries much of the engine weight in flight. The nose wheel carries much of the engine weight on the ground. There is no need for the stress of this weight to be handled by the fuselage structure at any time. The engine can be mounted to the canard spar (thru suitable engine mounts), either directly or thru a small section of firewall. The nose wheel can also be connected to the canard spar, either directly or thru a small section of firewall. Such a design provides support for the engine, both in flight and on the ground, with minimal stress in the fuselage structure.

Figure 1:
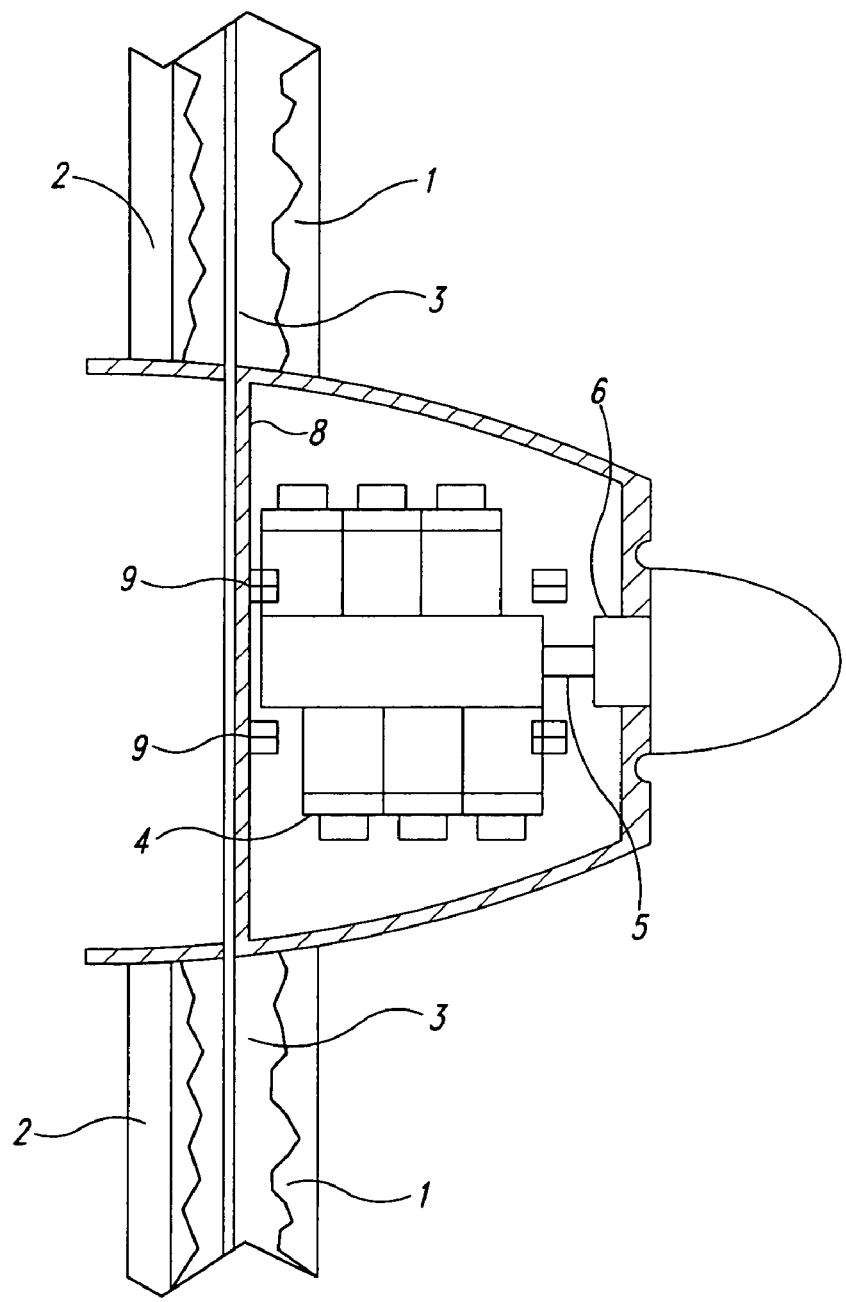
FIG. 1 is a top view in partial cross-section of the front of the airplane showing the location of the canard with its leading edge located well ahead of the firewall. In the situation shown here, the main spar of the canard is in, or adjacent to, the firewall providing the most rigid possible attachment for the canard.

One possible implementation of the far forward canard is shown in FIG. 1. The canard (1) with elevator (2) has a spar (3) that passes thru, or close to, the firewall (8). While it is not necessary for the spar to be located this close to the firewall, there are structural advantages to this arrangement. The engine (4) is mounted to the firewall (8), and possibly directly to the canard spar (3) via the rear engine mounts (9). Since the canard is essentially carrying the engine in flight, this relieves the airframe of the stresses associated with connecting the weight of the engine to the canard. It also locates canard (1) in a vertical position near the center of the fuselage. This is the lowest drag location for the canard. At the other end of the engine, the propeller (not shown) is connected to the drive shaft (5), either directly or thru a short prop extension (6).

Figure 2:
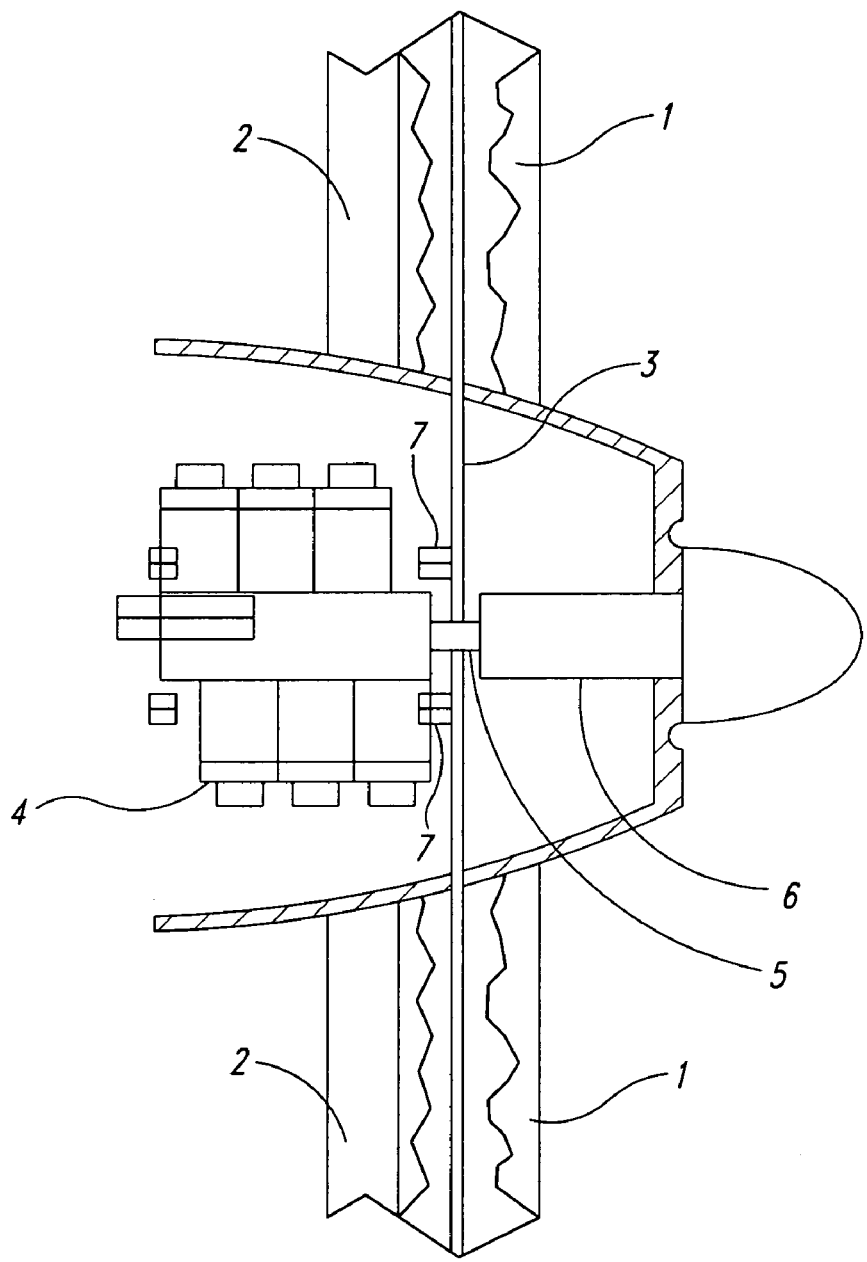
FIG. 2 is a top view in partial cross-section of the front of the airplane showing the location of the canard with its spar located in front of the engine. In the situation shown here, the engine is connected directly to the main spar of the canard, providing the best possible connection from the engine to the canard, which is essentially carrying the engine.

A second implementation of the far forward canard moves it even further forward as shown in FIG. 2. The canard (1)

with elevator (2) has a spar (3) that passes just in front of the engine (4) and just below the propeller drive shaft (5). The spar should be located as far forward as practical within the canard. This locates the canard as far back as possible, in order to minimize the length of prop extension (6). At best, prop extension (6) is very long, and it may require an additional support with a bearing (not shown). Alternatively, drive shaft (5) and prop extension (6) may be replaced by a gear box (not shown) that is securely attached to (or an integral part of) engine (4). With canard (1) in this position, the location off the spar (3) is such that it is easy to connect the front engine mounts (7) to it again eliminating much of the stress in the fuselage associated with connecting the engine to the canard.

It is possible, and certainly within the claims of this patent, to locate the canard between the positions shown in FIGS. 1 and 2. However, the canard spar must then pass over, under, or around the engine. In any realistic implementation of this, the spar will interfere with access to the engine and/or with the plumbing around the engine (carburetor, intake pipes, exhaust pipes, oil reservoir, oil cooler, and cooling ducts). This is already the most crowded region in the airplane without adding a canard spar to the mess.

To optimize the aerodynamics of the intersection of the canard with the fuselage, the canard should be located near the widest part of the fuselage. Normally, that will be located between 25% and 75% of the height of the firewall. For the pilot to have the best visibility, the canard will normally be located in the lower part of this range.

This innovation, placing the canard further forward, gives greater tolerance to CG location, reduces stresses in the air frame, and improves aerodynamics.

Wing Location

In a canard airplane, it is desirable for the canard to carry the engine and for the wing to carry the rest of the airplane. In this way, the low speed handling of the airplane, such as takeoff and landing, is little affected by gross weight. It is only required that the wing be large enough to carry the maximum allowable weight and still not stall at a lower speed than the canard.

In present canard airplanes, the wing is forced to be further back than desirable. This is largely a result of the requirement that the separation between the canard and the wing be great enough for the canard and elevator to provide satisfactory attitude control. With the canard located entirely behind the firewall, the wing is forced to be behind the cockpit. By moving the canard forward, the wing can also be moved forward, at least to the point of partially enclosing the cockpit. If the canard is mounted far enough forward (in front of the engine), a low wing may be located beneath the occupants of the plane. There are several aerodynamic advantages to this. (1) The sides of the airplane are flat and parallel above the wing, minimizing intersection drag. (2) The wing forms a flat floor the width of the cabin providing a level seat for the occupants in a recumbent position. (3) The height of the fuselage is minimized (thus minimizing fuselage surface area and drag) by building the wing with two spars with the occupants sitting on the bottom surface of the wing, between the spars. To accomplish this last item, the upper edge of the spars must be strong enough to replace the strength of the missing section of the top surface of the the wing within the fuselage. The wing with two spars is potentially applicable to any low wing airplane. But the wings of conventional airplanes are generally located further forward and the occupants sit behind a single spar near the center of lift of the wing.

Figure 3:
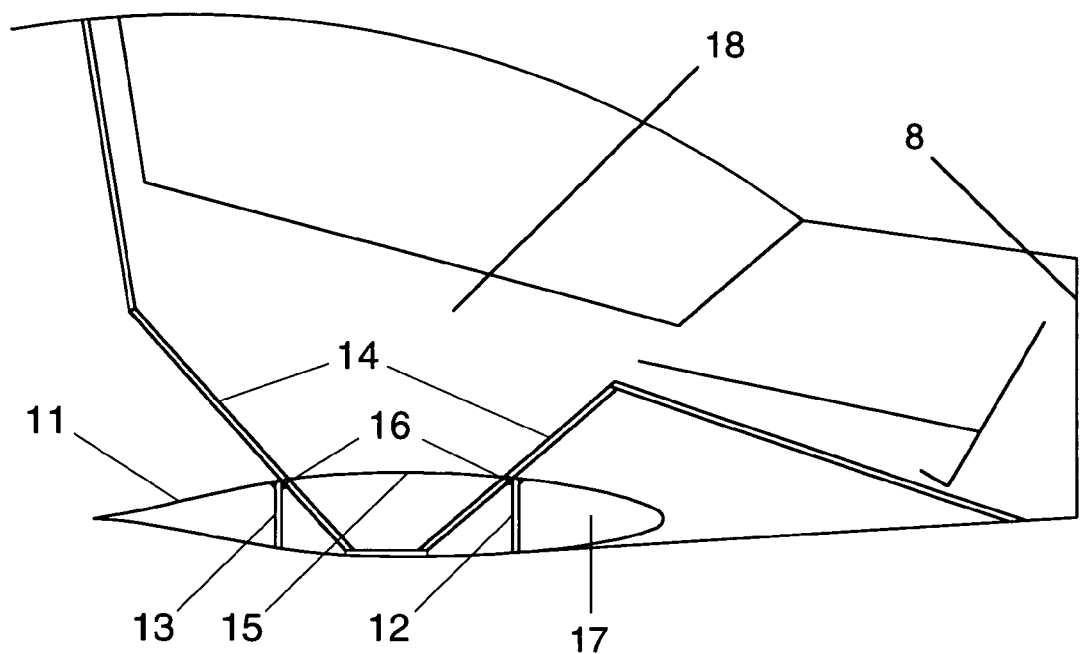
FIG. 3 is a side view of the central portion of the airplane showing a low wing, with two spars, and the seat occupying the space between the spars, producing a fuselage of minimum height, surface area, and drag.

A seat built within the wing between two spars shown in FIG. 3. FIG. 3 shows only the cockpit region of the plane, located behind firewall (8). The wing (11) with two spars (12 and 13), instead of the usual single spar, is located at the bottom of fuselage (18). The front spar (12) passes thru fuselage (18) under the thighs of the people (not shown). The rear spar (13) passes thru fuselage (18) under their lower back. The seat (14) is shaped so the people do not feel like they are sitting on two railroad rails. The top surface of the wing (15) is interrupted where it passes thru the cockpit, the loss of strength being made up by additional material (16) near the tops of the spars (12 and 13).

The forwardmost (12) of the two spars is used as the rear surface of the fuel tank (17), or, in the case of having a separate fuel tank, the rear mounting surface for said tank. This locates the fuel well forward in the wing, near the desired CG of the airplane. Thus the CG of the airplane will not move greatly as fuel is added or consumed. If the entire cross section of the wing is filled with fuel (or fuel tank), the CG of the airplane is significantly more dependent on the quantity of fuel being carried. This is not a dangerous condition, but it does require considerably more adjustment of the trim control during flight.

Figure 4:
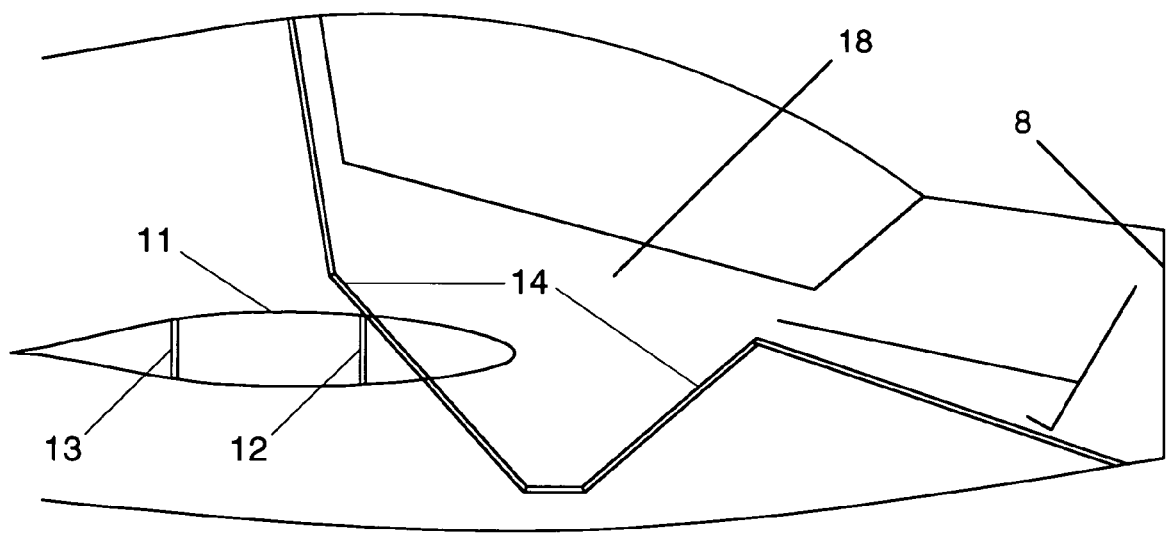
FIG. 4 is a side view of the central portion of the airplane showing a mid height wing, with two spars, mounted behind the seat, partially surrounding the cockpit.

Even if the canard is not far enough forward to allow the wing to be located under the cockpit, the wing can be moved forward from its usual position behind the cockpit so it partially surrounds the cockpit, as shown in FIG. 4. In this case, the wing is located near the widest part of the fuselage, between 25% and 75% of the height of the fuselage (normally in the lower part of this range because good ergonomic design puts the widest part of the cockpit at the elbows of the occupants). Again, FIG. 4 shows only a part of fuselage 18, from firewall 8 to the trailing edge of wing 11. Two spars 12 and 13 are shown, although it is common that the wing would be built with only one spar near the center of lift. Passing two spars 12 and 13 and the central portion of wing 11 thru fuselage 18 as a single unit in the form of a box beam increases the torsional stiffness of the wing. Note that in this configuration, the bottom of fuselage 18 will normally be rounded in cross section (not shown). In order to keep seat 14 horizontal, the lowest part of the bottom of fuselage 18 must be somewhat lower than seat 14. A horizontal seat is very desirable, not only for comfort but for safety. When you "fly by the seat of your pants", the seat of your pants better be straight and level.

Locating the wing spar(s) behind the cockpit has an additional advantage. If the wing has dihedral, as it usually will, the dihedral can be built into the spar(s) within the fuselage, leaving the external portion of the wing straight. This simplifies the control mechanism for the ailerons and flaps. If the ailerons are inboard of the flaps, it also allows the fairing between the aileron and the fuselage to be part of the aileron, thus reducing drag when the aileron is not in its neutral position.

The innovation of using a low wing in a canard airplane allows the center of lift of the wing to be located near the location of the load to be carried by the wing. The innovation of making that wing with two spars allows the occupants of the plane to be seated in the lowest possible position, minimizing frontal area and surface area of the fuselage, thus reducing aerodynamic drag and improving performance.

Aspect Ratio of the Canard.

It can be shown that the minimum ratio of canard loading to wing loading is related to the aspect ratio of the canard. In fact, the ratio of maximum safe wing loading to canard loading is:

max wing loading/canard loading=1−constant/aspect ratio

The constant is in the range of 4 and depends on the desired safety factor. As aspect ratio becomes large, the wing loading can approach the canard loading rather closely. This gives the smallest possible total area of the lifting surfaces for a given takeoff speed. This, in turn, gives the lowest possible drag at higher speeds. This fact was ignored by, or perhaps not known to, the designers of the Quickie family and its copies. The aspect ratio of the Q2 canard is a little over 7:1. The desirable aspect ratio is as large as possible short of encountering other problems such as significant increases in weight in order to achieve the required stiffness in the very slender structure. In the case of Quickie style airplanes, the limiting factor is the strength required to survive a hard landing with the main wheels at the tips of the canard.

With the wing and canard both moved forward, the canard will normally have less area than the wing. Using a high aspect ratio canard has the added advantage of making it possible to make the spans of the wing and canard essentially equal. A known problem in canard airplanes with shorter canard span than wing span (notably the EZ family) is that as the canard approaches stall, the wing tip turbulence from the canard affects the wing in such a way that it tends to stall also, leading to an unsafe flying condition. This does not happen if the canard span is nearly as large as the wing span (or larger than the wing span).

Relative Size of the Wing and Canard

With the wing and canard moved forward, it is possible to design an airplane with a forward engine and a canard that has a smaller shadow area than the wing. In some cases, the canard may carry less total weight than the wing, but still be loaded heavier than the wing because of its smaller size. This is the normal state of affairs in a canard plane with a pusher engine, but cannot be achieved in a front engine plane, unless the canard is moved forward of the firewall.

A known problem in canard airplanes with pusher engines is that the canard, being small, has less wing span than the wing. At low speed, the vortices off the canard tips disturb the air flow over the outer ends of the wings, and the wing tends to stall before the canard does. This is potentially catastrophic. To avoid such a condition, the wing of pusher canard airplanes is normally twisted to reduce the angle of attack outboard of the canard tips. This tends to reduce the efficiency of the wing at high speeds (by increasing its drag). An airplane with a forward engine and a far forward canard may face the same difficulty. In this case, a better solution is to make the wing and canard the same span, or essentially so, and adjust the relative aspect ratios to obtain the desired relative shadow areas. Since the downdraft from the canard does not go to zero abruptly at the tips of the canard, the wing may be a little bit longer than the canard without requiring a twist.

Obviously, if the wing and canard have similar spans, and the canard has a smaller shadow area, the aspect ratio of the canard is larger than the wing. In extreme cases, the canard becomes so slender that it is not self supporting. A vivid example is the Voyager. The solution for the Voyager was using the outboard fuel tanks, which spanned the distance between the canard and wing (and extended considerably further aft) to stabilize the tips of the canard. In a more normal situation (that doesn't include the goal of flying around the world without refueling), the wing and canard can be stable without being joined by outboard fuel tanks. As mentioned above, it is very desirable for the canard to have a high aspect ratio in any case. The aspect ratio of the wing is much less important.

Canard Flaps

Most canard airplanes do not have flaps. The reason is simple. In a canard airplane, wing flaps are counterproductive. A flap does three things. It increases the maximum coefficient of lift. It decreases the angle of attack for any given coefficient of lift. It also moves the center of lift aft. A wing flap, moving the center of lift aft, increases the load on the canard, and increases the minimum achievable flying speed. Since canard airplanes do not have flaps, their landing speeds are typically 20% to 30% higher than conventional aircraft with similar wing loading. This is undesirable. A canard flap alone is unacceptable because the lifting capacity of the canard could be increased to the point that the wing might stall, with likely fatal consequences.

A novel solution to the high landing speed problem is to put flaps on both the wing and canard with the linkage coordinated so the canard flaps cannot be used without the wing flaps. In this configuration, the maximum coefficients of lift of both flying surfaces are increased by similar amounts, yielding lower flight (and landing) speeds. Ideally, the flaps on the canard would be made slightly more powerful than the wing flaps. This would compensate for the aft movement of the center of lift as the flaps are deployed.

Wing flaps provide an additional factor of safety. If the pilot manages to load the airplane with the CG aft of the acceptable range, and then flies too slowly, the wing and canard can get into a condition where neither of them can support their load, and there is enough flow separation that the elevators lose their effect. Then the nose cannot be forced down to recover proper speed and lift. The plane descends rapidly, although it does not plummet, and the landing will likely break the airplane, even if it is on a smooth, level surface. This condition has occurred in the Quickie II. In this condition, deploying only the wing flaps slightly (into the non-separated air flow below the wing), but not the canard flaps, will increase the lift of the wing, move the center of lift aft, cause the plane to rotate nose down, pick up speed, and recover from the impending stall condition.

The wing flaps can be the same as are found on most conventional aircraft. The canard flaps can be something as simple as having the elevator mount accommodate a larger than usual range of downward motion. The elevator motion is limited by a linkage to the wing flap control to prevent the elevator from extending too far down unless the wing flap is extended. Alternatively, the canard flaps can be made larger than the elevator and be controlled directly by the flap control mechanism. There is nothing necessarily unique in the mechanisms that drive the flaps and elevators. The unique innovation is the use of flaps on the canard.

This innovation, providing flaps on both the wing and canard, and having them linked so the canard flaps cannot be deployed without deploying the wing flaps, allows lower flight and landing speeds. It also improves safety margin by providing a means for recovery from an impending stall where the elevator has lost its ability to push the nose down.

The invention claimed is:

1. An airplane, comprising: an engine located in a forward one-third of a fuselage, a propeller mounted forward of the engine, a firewall positioned between the engine and a cockpit, a fixed main wing located near a center of the airplane, a vertical stabilizer and rudder mounted at a rear of the airplane, and a canard mounted on the airplane to form an intersection with the fuselage such that, at the intersection of the canard with the fuselage, a leading edge of the canard is located forward of the firewall by a distance of at least one-quarter of a chord of the canard.

2. The airplane of claim 1 wherein the canard is located at least 25% of a height of the firewall above a bottom of the firewall and not more than 75% of the height of the firewall above the bottom of the firewall.

3. The airplane of claim 1 wherein the main wing is located in a lower 25% of the fuselage.

4. The airplane of claim 3 wherein the main wing comprises two main spars.

5. The airplane of claim 4 wherein seating for occupants is provided in a space between the two main spars.

6. The airplane of claim 1 wherein the main wing is located to partially overlap a cockpit in the fuselage.

7. The airplane of claim 1 wherein the engine is mounted to a spar of the canard.

8. The airplane of claim 7 wherein a nose wheel is mounted to the canard spar.

9. The airplane of claim 1 wherein a span of the main wing is less than 1.2 times a span of the canard.

10. An airplane, comprising: a fuselage, a single engine located in a forward one-third of the fuselage, a propeller mounted forward of the engine, a fixed main wing located near a center of the airplane that does not move relative to the fuselage, a vertical stabilizer and rudder mounted at a rear of the fuselage, and a canard directly connected to and intersecting the fuselage to not move relative to the fuselage and not connected to any outboard fuel tanks and not part of a vertical array of canards, the canard having a fixed camber and a shadow area smaller than a shadow area of the main wing.

11. The airplane of claim 10 wherein the canard is located at least 25% of a height of a firewall above a bottom of the firewall and not more than 75% of the height of the firewall above the bottom of said firewall.

12. The airplane of claim 10 wherein the main wing is located in a lower 25% of said fuselage.

13. The airplane of claim 12 wherein the main wing comprises two main spars.

14. The airplane of claim 13 wherein seating for occupants is provided between the two main spars in the main wing.

15. The airplane of claim 10 wherein the main wing is located such that it partially overlaps a cockpit of the airplane.

16. The airplane of claim 10 wherein the engine is mounted to a spar of the canard.

17. The airplane of claim 16 wherein the nose wheel is essentially mounted to the canard spar.

18. The airplane of claim 10 wherein a span of the wing is less than 1.2 times a span of said canard.

19. An airplane, comprising: an engine located in a forward one-third of a fuselage, a propeller mounted ahead of the engine, a main wing located near a center of the airplane that does not move relative to the fuselage, a vertical stabilizer and rudder mounted at a rear of the fuselage, and a fixed-camber canard directly connected to and intersecting the fuselage to not move relative to the fuselage and not connected to any outboard fuel tanks and not part of a vertical array of canards, the canard having an aspect ratio of 10:1 or greater.

20. The airplane of claim 19 in which a span of the main wing is less than 1.2 times a span of the canard.

* * * * *